(12) United States Patent
Likar et al.

(10) Patent No.: US 8,472,334 B2
(45) Date of Patent: Jun. 25, 2013

(54) METHOD FOR SELF ORGANIZING NETWORK OPERATION

(75) Inventors: Bojan Likar, Ig (SI); Robert Posel, Ljubljana (SI); Andreas Kalagasidis, Ljubljana (SI); Tomaz Javornik, Grosuplje (SI); Gorazd Kandus, Ljubljana (SI); Janez Sterle, Ljubljana (SI); Urban Sedlar, Bohinjska Bistrica (SI); Janez Bester, Zg. Besnica (SI); Andrej Kos, Blejska Dobrava (SI); Luka Mali, Novo Mesto (SI)

(73) Assignee: Accelera Mobile Broadband, Inc., Santa Clara, CA (US)

( * ) Notice: Subject to any disclaimer, the term of this patent is extended or adjusted under 35 U.S.C. 154(b) by 316 days.

(21) Appl. No.: 12/827,965

(22) Filed: Jun. 30, 2010

(65) Prior Publication Data

US 2012/0002557 A1    Jan. 5, 2012

(51) Int. Cl.
*H04L 12/26* (2006.01)
*H04Q 7/00* (2006.01)

(52) U.S. Cl.
USPC .......................................... 370/252; 370/328

(58) Field of Classification Search
USPC .......................... 370/241, 252, 328, 338, 401
See application file for complete search history.

(56) References Cited

U.S. PATENT DOCUMENTS

| | | | |
|---|---|---|---|
| 7,627,347 B2 * | 12/2009 | Codreanu et al. | 455/562.1 |
| 2007/0076650 A1 * | 4/2007 | Manjeshwar et al. | 370/328 |
| 2008/0070580 A1 * | 3/2008 | Menich et al. | 455/446 |
| 2010/0167730 A1 * | 7/2010 | Shin | 455/434 |
| 2010/0216486 A1 * | 8/2010 | Kwon et al. | 455/452.2 |
| 2011/0014925 A1 * | 1/2011 | Antic et al. | 455/452.2 |

* cited by examiner

*Primary Examiner* — Hong Cho
(74) *Attorney, Agent, or Firm* — Van Pelt, Yi & James LLP

(57) ABSTRACT

The present invention relates to wireless cellular telecommunication networks and, in particular, to control and management of self organizing wireless cellular telecommunication network. A method for network planning and frequency optimization in LTE networks by determining the optimal base station configuration parameters, comprises a base station initialization, an initial base station configuration, an iterative measurement procedure, an optimization process, a verification of operation, and a periodical maintenance procedure.

10 Claims, 3 Drawing Sheets

METHOD FOR SELF ORGANIZING NETWORK OPERATION

FIELD OF THE INVENTION

The present invention relates to wireless cellular telecommunication networks and, in particular, to control and management of self organizing wireless cellular telecommunication network.

BACKGROUND OF THE INVENTION

Wireless cellular telecommunication networks comprise a core data network and a wireless network. The wireless access part of the network must be carefully planned in order for each user to receive the radio signal of sufficient quality. The strength and quality of the signal in the core part of the network enable adequate capacity of services in the wireless telecommunication network.

The proper coverage of a geographical area with a radio signal is provided by means of macro base stations grouped in a cluster of cells. In order to increase the wireless network capacity, distributed small base station entities have been considered which have been defined as nano, pico and femto base stations with a smaller radio coverage in comparison to macro base stations.

Operating parameters, such as operating frequency, antenna orientation, transmission intensity and so forth, are essential for optimal wireless access telecommunication network operation. Within a discrete geographic region the base stations are assigned a limited number of carrier frequencies. Suitable choice of many other operating parameters is also important. The of a base station or of an individual mobile terminal often has a profound effect on both the interference generated for other base stations or for users who are not the intended receiver of the transmission. This reduces the probability of successful transmission reception by the intended receiver. A variety of other operating parameters, in addition to the operating frequency, such as antenna orientation, handoff thresholds, traffic power limits, and pilot power fraction of total amplifier power similarly affect network function.

In establishing an operating communications network, identification parameters are set for each base station, often enumerating as many as few hundred base stations for a metropolitan area. Thus, significant planning based on above mentioned parameters typically precedes such establishment. Although at least some of these parameters are adjusted as the network evolves, the incipient choices are carefully made to avoid initial network failure or to avoid an excessive duration and area of unacceptable operation. Even after the network becomes operational, further base stations are added as the network expands. Such additional base stations have identification and operating parameters that require initialization. A poor initial choice of parameters has the potential for causing a network failure or unacceptable degradation of reception for existing users.

Currently, radio networks are being planned using specialized planning software which initially estimates the radio signal from different base station sites. The planning software is then used to calculate interference between base stations which affects the performance of the radio network. In addition to planning software, different kinds of measurement equipment is used in radio network planning, such as field measuring devices, a radio network control system, and specialized software for comparing the estimated and measured data, presenting the information in visual form or in other ways. Traditional network planning comprises radio frequency measurements to determine environmental factors and extensive simulations based on the measured data to determine the optimal placement and parameters of base stations.

One purposed approach for reducing complexity of the network management, thus reducing the expenditures, is auto configuration. In auto configuration procedures a base station automatically establishes some or all of its own identification and operations parameters upon initialization.

SUMMARY OF THE INVENTION

The invention describes a method for auto configuration of mobile telecommunication networks. The auto configuration procedure is based on the location data, provided by the base station using a variety of inputs. Following the initialization procedure, the self organizing network (SON) server calculates a set of safe operating parameters which are sequentially fed to the newly initialized base station. Newly initialized base station is set into signal generation mode, and neighbouring base stations are sent a command to begin a measurement mode. The measurement is conducted by the neighbouring base station by communicating with the stationary mobile stations. Relevant characteristic data of the mobile radio network at the position of the mobile radio station are acquired by the mobile radio terminal device under normal conditions of use and the measured data is sent to the neighbouring base station. Neighbouring base station relays the data to the SON server for further analysis. The procedure is repeated for all calculated candidate configurations.

The subsequent further processing of the thus forwarded data can advantageously be used for planning and optimization of the radio network infrastructure (neighbourhood planning, setting of operating parameters, etc.).

Main motivation for described procedures is the reduction of the complexity of network management processes and consequential reduction of operational expenses.

BRIEF DESCRIPTION OF THE FIGURES

A method for auto configuration of mobile telecommunication networks according to the present invention will be described in details hereinafter with references to the accompanying figures, wherein.

DESCRIPTION OF PREFERRED EMBODIMENTS

Figure 1:
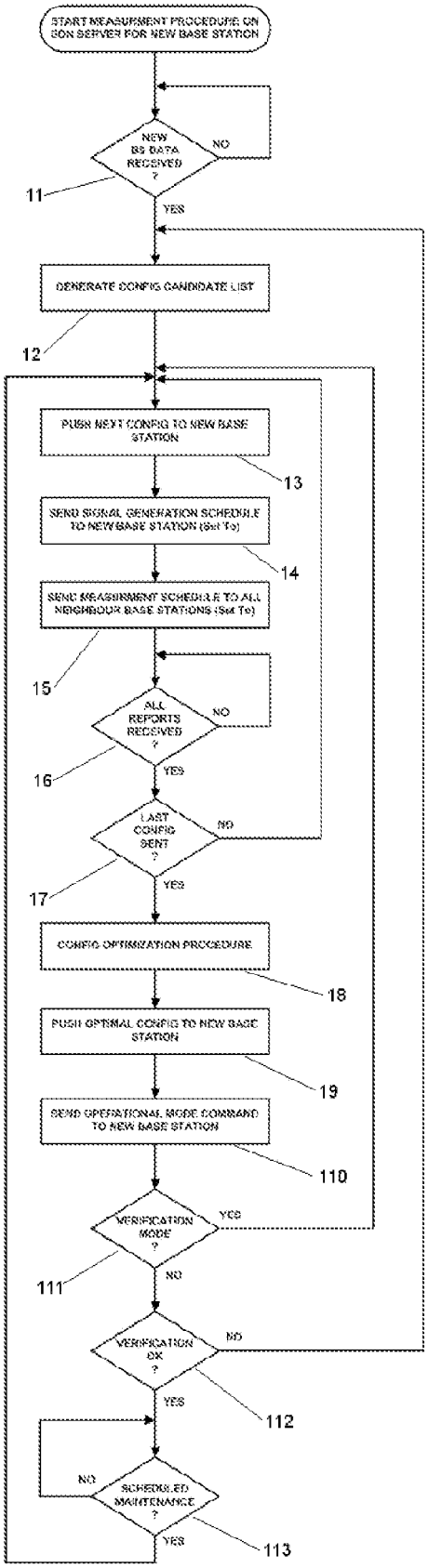
FIG. 1 shows schematically steps of a method according to the invention carried out on the SON server.

A sequential diagram of an algorithm carried out on said SON server can be depicted from FIG. 1. Lists of neighbouring base stations, mobile terminals and configuration files for a new base station are prepared on said SON server. The latter determines a start of the precise synchronised measurement, and receives measured data upon finished measurements and calculates optimal operational radio parameters in order to start a new base station. In addition, said SON server takes care of the verification steps.

A method is carried out on said SON server taking care of the execution of the measuring procedure in said self organizing network. At the beginning, said SON server waits for an initialization request from a new base station (step 11).

When such a request is received by said SON server, it prepares for said new base station a list of configuration files comprising operational parameters (step 12). When said list is ready, said SON server transmits the first configuration file to a new base station (step 13). In the next step, said SON server sends a command to execute measurements to a new base station (step 14) and to neighbouring base stations (step 15) which are determined by means of the location and the orientation of an antenna of the new base station and selected frequency being determined in the first configuration file. Said SON server is put into a state where it waits for expected measuring results from the neighbouring base stations (step 16). A measuring process is repeated for all further configuration files (step 17). When all the intended measurements are finished, said SON server carries out an optimization process of operational parameters (step 18). The calculated optimal configuration file is transmitted to a new base station (step 19). Said new base station is marked as an operational one (step 110), thus the latter become equivalent to the others in the network and is ready to receive mobile terminals. During the starting hours and days the measurement with optimal parameters are repeated several times (step 111) which is necessary in order to confirm the adequacy of the assigned radio parameters. If the verification fails (step 112), the process is repeated for all files, wherein again there are searched optimal operational radio parameters of the system. Said SON server also comprises a schedule of a so called system maintenance, when several times a year the adequacy of the base station (step 113) radio parameters are verified again.

Figure 2:
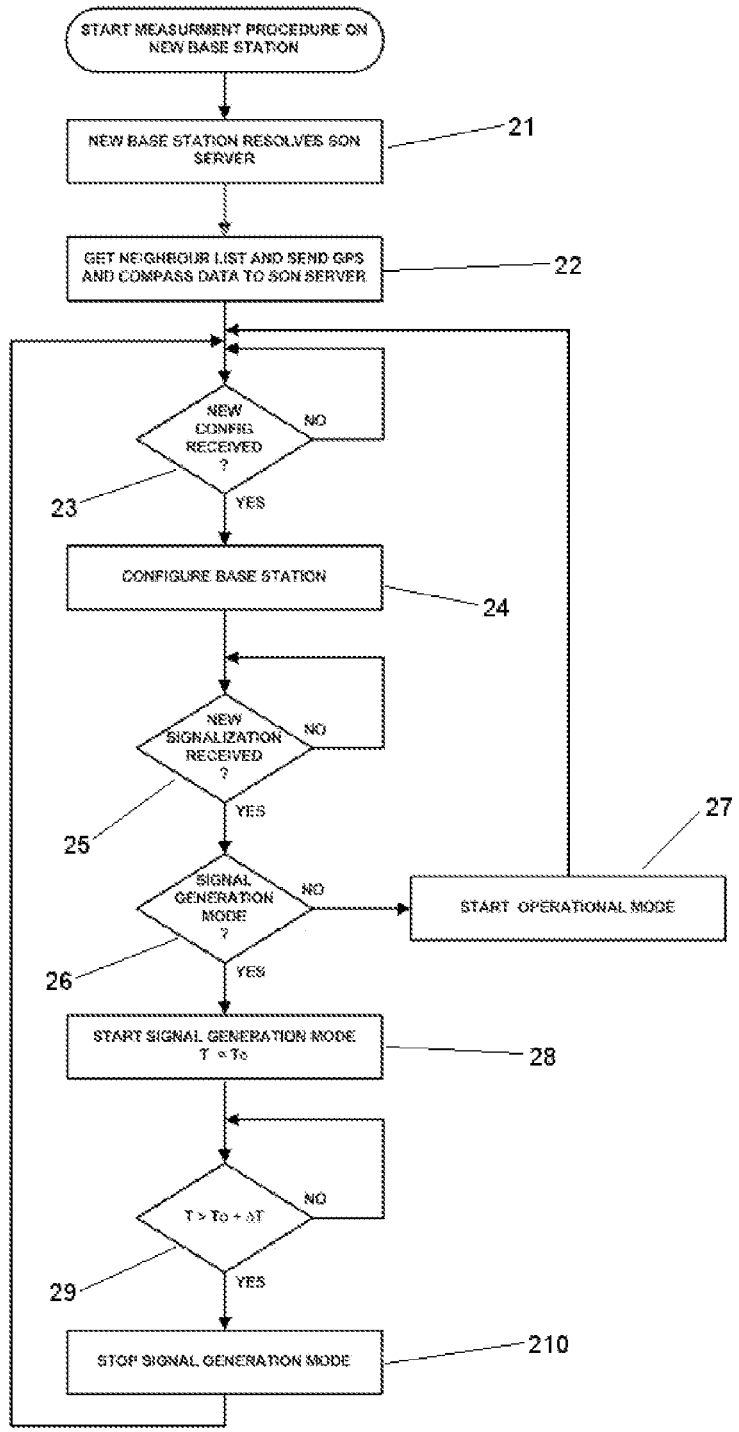
FIG. 2 shows schematically steps of a method according to the invention carried out on a new base station.

A sequential diagram of an algorithm carried out on a new base station may be depicted from the FIG. 2. Based on the time synchronisation with said SON server said new base station starts to broadcast a synthesized radio signal of a full power with radio parameters determined by said SON server. Said base station operates as the operational base station, yet it does not accept any mobile terminals.

Upon start-up, said base station acquire by means of a DHCP protocol (step 21) an address of said SON server and transmits to the latter the data of its own location and antenna orientation acquired by means of a GPS receiver and electronic compass (step 22). Said new base station is put in a state for obtaining the configuration file (step 23). When said configuration file is received, the radio parameters (step 24) are set accordingly. When said new base station receives a signal impulse (step 25) which represents a time synchronised request for a measurement (step 26), it starts at the time To with the broadcasting of a synthesized radio signal (step 27). After the planned time frame for carrying out an individual measurement (step 28) has expired, said new base station stops transmitting the synthesized radio signal (step 29). Upon the finished measurements, said new base station receives from said SON server an optimal configuration file representing radio parameters for operating of said base station which may now receive mobile terminals (step 210).

Figure 3:
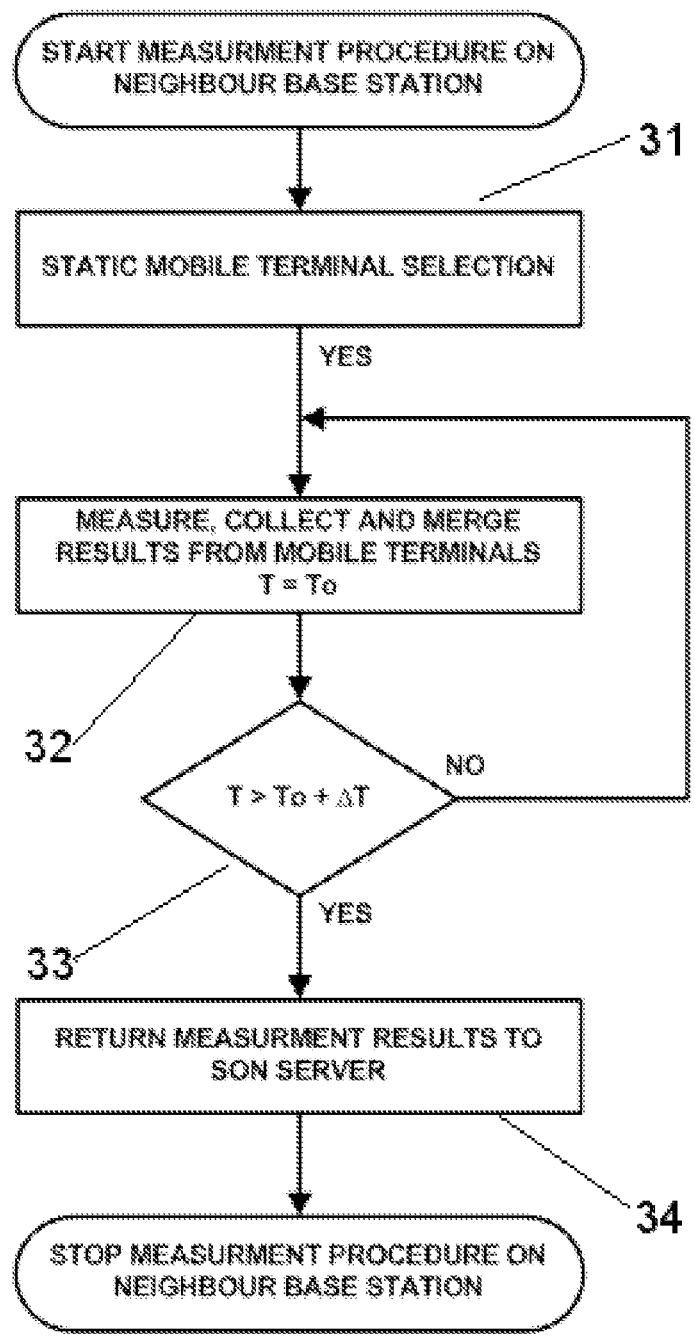
FIG. 3 shows schematically steps of a method according to the invention carried out on neighboring base stations.

FIG. 3 represents a sequential diagram of an algorithm carried out on neighbouring base stations. Said neighbouring base stations are determined within said SON server on the basis of the information regarding the position and the orientation of the antenna of a new base station, separately for each frequency measured. Neighbouring base stations carry out radio measurements by means of stationary mobile terminals which are, within the time frame provided for carrying out said measurements, connected with the base stations. The measuring process on the mobile terminals is standardized.

When the neighbouring base station receives a request for measurement from said SON server, it prepares a list of stationary mobile terminals (step 31). Said stationary mobile terminals are terminals where measurements of radio conditions do not change over time. At the time To (step 32) the neighbouring base stations start sending cyclic standardized requests for measurement to all attached stationary mobile terminals. Said mobile terminals answer the requests with measuring the results, and the base station accepts said results and provides them with time stamp. The measurement is finished at the time T>To+ΔT (step 33), when said neighbouring base station sends measuring results to said SON server (step 34).

What is claimed is:

1. A method for network planning and frequency optimization in LTE networks by determining a set of optimal base station configuration parameters for a base station by a self-organizing network (SON) server, comprising:
   receiving an indication that the base station has been initialized;
   generating a plurality of sets of possible base station configuration parameters by varying the frequency and the power of transmission, taking into account, if available, a base station location, a base station orientation, and information about neighboring base stations from a database;
   arranging the generated plurality of sets of possible base station configuration parameters in an order from most optimal to least optimal based on a calculated metric;
   sending a most optimal set of base station configuration parameters to the base station, wherein the most optimal set of base station configuration parameters comprises settings regarding two or more of the following: frequency of operation, bandwidth, time division duplex (TDD) split, power, and fraction;
   receiving iterative measurement results;
   determining an optimized set of base station configuration parameters based at least in part on the iterative measurement results;
   verifying operation of the base station; and
   performing a periodic maintenance procedure.

2. The method of claim 1, wherein the initialization of the base station comprises:
   the base station acquiring an IP address from the SON server;
   the base station determining the base station location and the base station orientation; and
   the base station sending the acquired base station location and base station orientation to the SON server.

3. The method of claim 1, wherein the iterative measurement results comprise results from an iterative measurement procedure, and wherein the iterative measurement procedure comprises the following steps:
   instructing the base station to initialize an active measurement procedure;
   determining a list of visible neighboring base stations by querying a SON sever database;
   instructing the neighboring base stations to initialize a passive measurement mode;
   gathering measured results from the neighboring base stations; and
   repeating the active measurement, the passive measurement, and the gathering for each of the plurality of sets of possible base station configuration parameters.

4. The method of claim 3, wherein instructing the base station to initialize the active measurement procedure further comprises the following steps:
   sending a signal to the base station, providing a duration and a frequency of the active measurement, wherein the base station begins a signal generation procedure obeying the specified frequency and duration.

5. The method of claim 3, wherein instructing neighboring base stations to initialize the passive measurement mode further comprises the following steps:

sending a signal to the neighboring base stations, providing a duration and a frequency of the active measurement, wherein a neighboring base station receives the signal, and wherein the neighboring base station identifies mobile terminals, and wherein the neighboring base station instructs the identified connected mobile terminals to measure interference with the signal-emitting base station, and wherein interference with the signal-emitting base station is estimated, and wherein said mobile terminals periodically report the measured parameters, together with delta t for location estimation, back to the neighboring base station.

6. The method of claim 5, wherein identifying the mobile terminals comprises the following steps:

querying a database for information about connected mobile stations; and performing a short-term moving average calculation and identifying the base stations with stable signal strength.

7. The method of claim 5, wherein estimating interference with the signal-emitting base station further comprises observing a temporal variance of base station signal strength and a Carrier to Interference and Noise Ratio.

8. The method of claim 3, wherein verifying operation comprises the following steps:

periodically disabling the operation of the base station, which causes the mobile stations to migrate to neighboring base stations;

repeating the measurement procedure as described in claim 4, using the optimized set of base station configuration;

comparing the measurement results with the previously established results of the optimal configuration; and concluding the verification if the newly obtained results fall within a margin of results of previously established optimal configuration.

9. The method of claim 8, wherein performing the periodic maintenance procedure comprises repeated verification as described in claim 10 over longer intervals.

10. The method of claim 1, wherein determining the optimized set of base station configuration parameters comprises the following steps:

calculating an optimal frequency and transmission power configuration based on aggregated base station signal strength and Carrier to Interference and Noise Ratio information from mobile stations, using minimum interference as the most significant metric;

sending the said optimal configuration to the base station;

sending a message to the base station, activating a base station operational mode; and sending information about a newly activated base station to neighboring base stations.

* * * * *

UNITED STATES PATENT AND TRADEMARK OFFICE
CERTIFICATE OF CORRECTION

PATENT NO. : 8,472,334 B2  
APPLICATION NO. : 12/827965  
DATED : June 25, 2013  
INVENTOR(S) : Likar et al.

Page 1 of 1

It is certified that error appears in the above-identified patent and that said Letters Patent is hereby corrected as shown below:

In the claims,

In column 4, claim 3, line 55 after "SON" delete "sever" and insert --server-- therefor.

Signed and Sealed this
Twenty-eighth Day of June, 2016

Michelle K. Lee
*Director of the United States Patent and Trademark Office*